(12) United States Patent
Ichihashi

(10) Patent No.: US 6,686,980 B1
(45) Date of Patent: Feb. 3, 2004

(54) ANISOTROPIC FILM CONTAINING A COPOLYMER INCLUDING A MONOMER CONTAINING A DICHROIC DYE AND LIQUID CRYSTAL DISPLAY CONTAINING THE ANTSOTROPIC FILM

(75) Inventor: Mitsuyoshi Ichihashi, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/705,907

(22) Filed: Nov. 6, 2000

(30) Foreign Application Priority Data

Nov. 4, 1999 (JP) ......................... P. 11-313981

(51) Int. Cl.⁷ ..................... G02F 1/1335; C09K 19/52
(52) U.S. Cl. ..................... 349/96; 430/321; 428/1.31
(58) Field of Search .................. 428/1, 1.31; 430/20, 430/321; 349/96

(56) References Cited

U.S. PATENT DOCUMENTS

| | | | |
|---|---|---|---|
| 4,631,328 A | * 12/1986 | Ringsdorf et al. .......... 526/259 |
| 4,758,447 A | 7/1988 | Broer et al. |
| 4,925,589 A | * 5/1990 | Lorenz ..................... 252/299.01 |
| 4,974,941 A | 12/1990 | Gibbons et al. |
| 5,024,784 A | * 6/1991 | Eich et al. ............. 252/299.01 |
| 5,024,850 A | * 6/1991 | Broer et al. .................... 428/1 |
| 5,151,516 A | * 9/1992 | Beck et al. ................. 546/37 |
| 5,235,449 A | * 8/1993 | Imazeki et al. ............... 349/96 |
| 5,385,690 A | * 1/1995 | Finkelmann et al. .. 252/299.01 |
| 5,389,285 A | * 2/1995 | Shannon et al. ......... 252/299.1 |
| 5,612,801 A | 3/1997 | Winker |
| 5,667,719 A | * 9/1997 | Mortazavi et al. ...... 252/299.01 |
| 5,707,544 A | * 1/1998 | Kelly ..................... 252/299.01 |
| 5,739,296 A | * 4/1998 | Gvon et al. ................. 534/577 |
| 5,746,949 A | * 5/1998 | Shen et al. .................. 252/585 |
| 5,751,389 A | * 5/1998 | Andreatta et al. ............ 349/97 |
| 5,837,160 A | * 11/1998 | Dietz et al. ............ 252/299.01 |
| 5,851,423 A | * 12/1998 | Teng et al. ............... 252/299.1 |
| 6,007,745 A | * 12/1999 | Coates et al. ............... 252/585 |
| 6,174,394 B1 | * 1/2001 | Gvon et al. |
| 6,320,629 B1 | * 11/2001 | Hatano et al. ................ 349/15 |
| 6,337,111 B1 | * 1/2002 | Ichihashi ................... 428/1.31 |
| 6,417,899 B1 | * 7/2002 | Jones et al. .................... 349/96 |
| 6,496,239 B2 | * 12/2002 | Seiberle ...................... 349/98 |
| 6,541,185 B1 | * 4/2003 | Matsunaga et al. ......... 430/321 |

FOREIGN PATENT DOCUMENTS

| | | |
|---|---|---|
| EP | 0 331 233 A2 | 9/1989 |
| JP | 3-140921 | 6/1991 |
| JP | 7-5467 | 1/1995 |
| JP | 8-313729 | 11/1996 |

OTHER PUBLICATIONS

Kozenkov et al, "Thin Photo–Patterned Internal Polarizers for LCDs", SID 00 Dig, May 2000, pp. 1099–1101.*
Patent Abstracts of Japan No. 03–140921, Jun. 14, 1991.
Patent Abstracts of Japan No. 08–313729, Nov. 29, 1996.

* cited by examiner

Primary Examiner—Kenneth Parker
(74) Attorney, Agent, or Firm—Sughrue Mion, PLLC

(57) ABSTRACT

An anisotropic film is described, which is a hard film with maintaining the orientation of a polymerizable dichroic dye and forming a copolymer with other polymerizable monomer.

9 Claims, 1 Drawing Sheet

- 10: SUBSTRATE
- 12: ITO
- 16: POLARIZING FILM
- 14: ORIENTATION FILM
- 18: LIQUID CRYSTAL
- 16: POLARIZING FILM
- 12: ITO
- 10: SUBSTRATE

APPLIED VOLTAGE (V)
(1000Hz SQUARE WAVE)

ANISOTROPIC FILM CONTAINING A COPOLYMER INCLUDING A MONOMER CONTAINING A DICHROIC DYE AND LIQUID CRYSTAL DISPLAY CONTAINING THE ANTISOTROPIC FILM

FIELD OF THE INVENTION

The present invention relates to an anisotropic film and a liquid crystal display using the same, and more specifically relates to an anisotropic film which can be used as a polarizing film of a liquid crystal display with maintaining the orientation of a polymerizable dichroic dye, and a liquid crystal display using the anisotropic film as a polarizing film.

BACKGROUND OF THE INVENTION

In electron display, conventional CRT has come to be replaced with liquid crystal display (LCD) which is thin, light weight, and low electrical power consumption. In particular, plastic LCD in which a plastic film is used as a substrate in place of a glass substrate is characterized in that it is bendable, and capable of heterogeneous processing, but it is hardly cracked, besides the above characteristics. Therefore, plastic LCD is promising.

However, when an inexpensive polyethylene terephthalate film is used as the plastic substrate of plastic LCD, it is impossible to make the film substrate completely isotropic due to the properties of polyethylene terephthalate. If the substrate is not isotropic, undesirable phenomena, e.g., a leak of light, etc., occur in the liquid crystal display. For making the plastic film substrate completely isotropic, it is necessary to use expensive plastic materials.

The phenomenon of a light leak can be prevented by providing a polarizing film on the inside of the substrate of a liquid crystal display, but the thickness of a polarizing film is generally 200 μor so, therefore it is substantially impossible to provide a polarizing film on the inside of the substrate.

Further, since a liquid crystal display has a visual angle characteristic, a liquid crystal display should be viewed within a limited visual angle for obtaining an image of the tone having no abnormality and high contrast. For improving the visual angle characteristic of a liquid crystal display, a liquid crystal display having a plurality of liquid crystal domains periodically different in the states of orientation of the liquid crystal and different in the visual angle characteristic of the liquid crystal in the same twist direction by 90° has been supposed (disclosed in JP-A-7-5467 (the term "JP-A" as used herein means an "unexamined published Japanese patent application")).

When a conventional polarizing film is used in a liquid crystal display having a plurality of liquid crystal domains different in the states of orientation, the polarizing axis of a polarizing film of every liquid crystal domain cannot be controlled. Accordingly, only the polarized light of the component which coincides with the polarizing axis direction of the detection side of the polarized lights passing the liquid crystal domain can be detected and a liquid crystal display having sufficient contrast cannot be obtained.

This problem results from the fact that conventional polarizing films cannot be patterned to the prescribed pattern. This is because it is extremely difficult with conventional polarizing films to arrange the part having a prescribed polarizing axis at the prescribed position of a film since conventional polarizing films are manufactured by the process of stretching high molecular films in the specific direction as a whole. Accordingly, it has been substantially impossible to arrange the part having a prescribed polarizing axis at the prescribed position of a liquid crystal display using conventional polarizing films.

SUMMARY OF THE INVENTION

An object of the present invention is to provide an anisotropic film which can be provided on the inside of the cell of a liquid crystal display as a polarizing film.

Another object of the present invention is to provide an anisotropic film functioning as a patterned polarizing film which makes it possible to arrange the part having a prescribed polarizing axis at the prescribed position of a liquid crystal display.

A further object of the present invention is to provide a liquid crystal display in which the above-described anisotropic film is provided on the inside of a liquid crystal cell.

The above objects of the present invention have been accomplished by the following means.

(1) An anisotropic film which is a hard film with maintaining the orientation of a polymerizable dichroic dye and forming a copolymer with other polymerizable monomer.

(2) The anisotropic film as described in the above item (1), wherein the hard film is formed by coating, on a substrate having been subjected to orientation, a solution containing a polymerizable dichroic dye, other polymerizable monomer and a polymerization initiator to orientate the polymerizable dichroic dye contained in the solution, and performing copolymerization reaction in the orientated state.

(3) The anisotropic film as described in the above item (2), wherein the coating solution contains in the ratio of from 50 to 95 wt % of a polymerizable dichroic dye, from 1 to 50 wt % of other polymerizable monomer, and from 0.5 to 5 wt % of a polymerization initiator (the components total up to 100 wt %).

(4) The anisotropic film as described in the above item (1), (2) or (3), which maintains the smectic state orientation of the polymerizable dichroic dye.

(5) The anisotropic film as described in the above item (1), (2) or (3), which maintains the smectic state orientation of the polymerizable dichroic dye.

(6) The anisotropic film as described in the above item (1), wherein the orientation direction of the polymerizable dichroic dye is maintained by patternization.

(7) A liquid crystal display, wherein the anisotropic film described in the above item (1) is provided on the inside of a cell as a polarizing film.

(8) A liquid crystal display, wherein the anisotropic film described in the above item (6) is provided at a cell as a polarizing film.

(9) The liquid crystal display as described in the above item (8), wherein the anisotropic film is provided on the inside of a cell.

The anisotropic film of the present invention is manufactured by orientating a dichroic dye in high order and fixing the dye while maintaining the orientation. Therefore, for example, even a thin layer having a thickness of 0.1 μm or so can be made a polarizing film having high polarizing property. Conventional polarizing films were substantially incapable of being provided on the inside of the cells of liquid crystal displays due to their thickness of 200 μm or so. However, the anisotropic film of the present invention can be provided on the inside of the cells, as a result, a liquid crystal display capable of ensuring sufficient light-shielding property and free of the problem of a leak of light can be obtained even when a plastic substrate is anisotropic.

When the anisotropic film of the present invention whose orientation direction is patternized and having a polarizing property, e.g., the anisotropic film which comprises domains shifting by 90° in the direction of orientation formed alternately and periodically and having a polarizing property, is used as apolarizing film of a liquid crystal display, a liquid crystal display having a plurality of liquid crystal domains periodically different in the state of orientation of the liquid crystal and different in the visual angle characteristic of the liquid crystal in the same twist direction by 90° can be easily obtained. Such a liquid crystal display exhibits excellent visual angle characteristic. In this case, the anisotropic film may be provided on the inside of a cell or may be provided on the outside of a substrate. It is of course preferred to provide an anisotropic film on the inside of a cell when the substrate is a plastic substrate.

Figure 1:
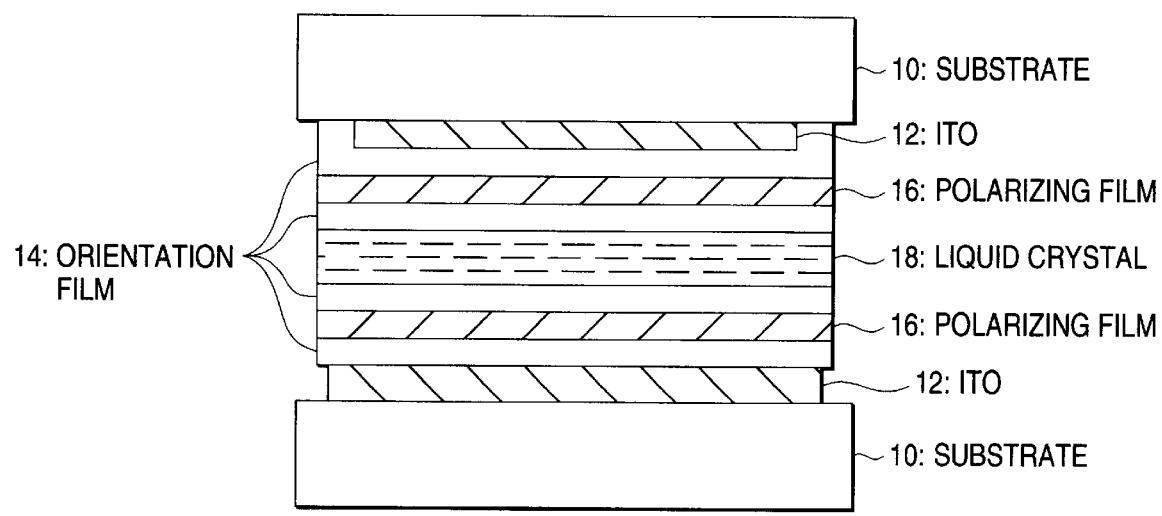
FIG. 1 is a schematic cross-sectional view showing the constitution of the liquid crystal display prepared in Example 1.

Key to the Symbols:

10: Glass substrate
12: ITO
14: Orientation film
16: Polarizing film
18: Liquid crystal

DETAILED DESCRIPTION OF THE INVENTION

The present invention will be described in more detail below.

As the polymerizable dichroic dyes which are used for forming an anisotropic film according to the present invention, those having polymerizable carbon-carbon unsaturated bonds at molecular terminals are preferably used. The polymerizable dichroic dyes may be any of an azo dye, an anthraquinone dye, and a benzoquinone dye. The polymerizable dichroic dyes in the present invention are those whose light transmittances vary as the orientation states vary, hence they are liquid crystals similar to general dichroic dyes.

The compounds represented by the following formulae can be exemplified as the specific examples of the polymerizable dichroic dyes.

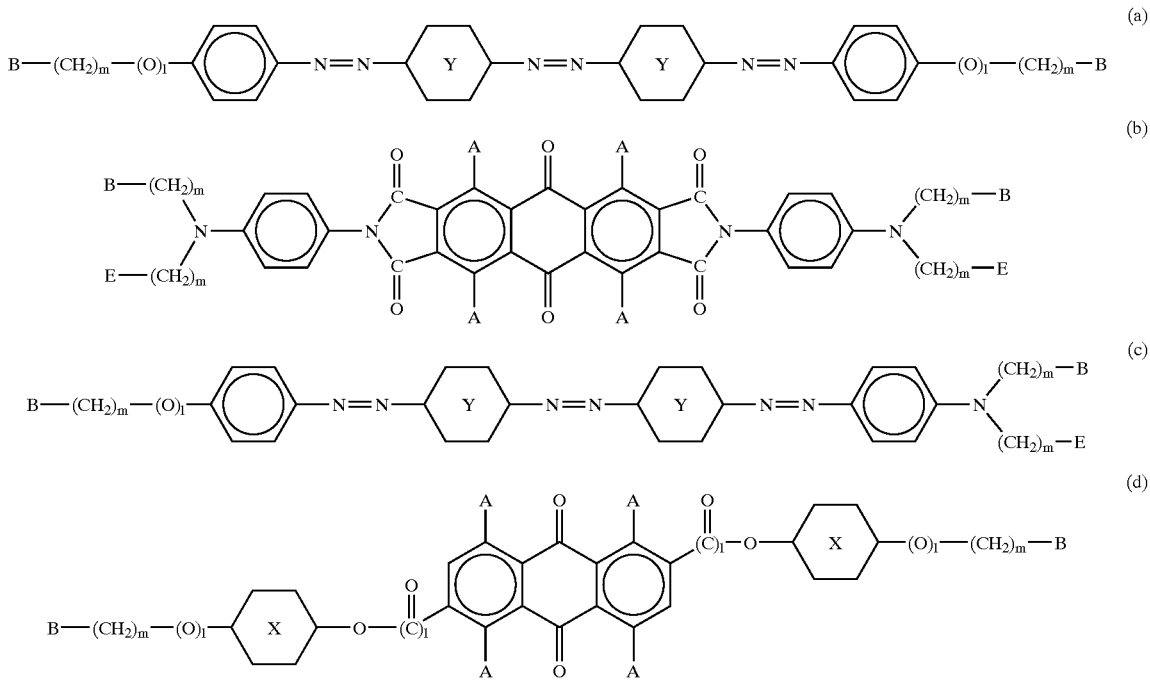

$l$ = 0, or 1
$m$ = 0–12
$A$ = H, or $NH_2$, or OH

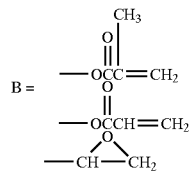

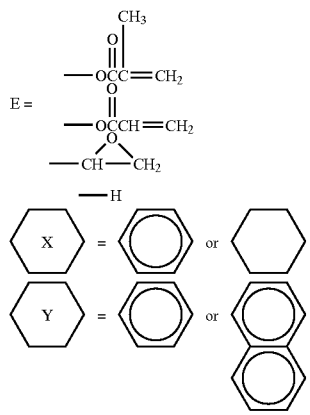

As other polymerizable monomers for forming copolymers by copolymerizing with polymerizable dichroic dyes, polyfunctional monomers are preferably used and bifunctional or trifunctional monomers are more preferred. By using such polyfunctional monomers, the hard film after copolymerization forms three dimensional network structure and becomes tough. Monomers having a molecular weight of 200 or more are preferred, and those having a molecular weight of from 300 to 2,500 are more preferred. When such relatively high molecular weight monomers are used, the obtained hard film has also flexibility. That is, the hard film after copolymerization has both toughness and flexibility.

As the specific examples of other polymerizable monomers, the following compounds can be exemplified.

(a) HX-620 (manufactured by Nippon Kayaku Co., Ltd.)

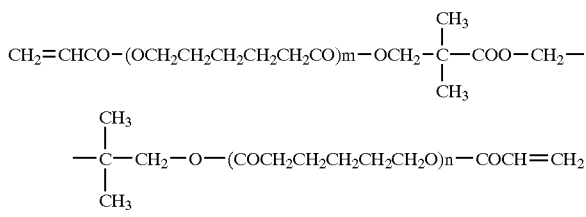

m.w. = 768
m + n = 4

(b) PEG400DA (manufactured by Nippon Kayaku Co., Ltd.)

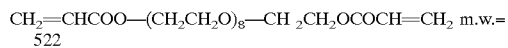

m.w. = 522

(c) RP-1040 (manufactured by Nippon Kayaku Co., Ltd.)

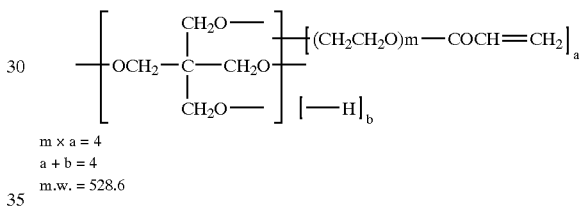

m × a = 4
a + b = 4
m.w. = 528.6

(d) 4G (manufactured by Nippon Kayaku Co., Ltd.)

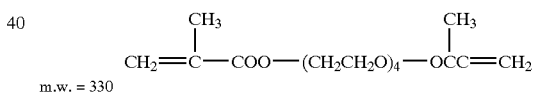

m.w. = 330

(e) R-167 (manufactured by Nippon Kayaku Co., Ltd.)

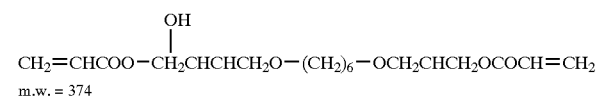

m.w. = 374

(f)

DCPA - 60

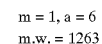
m = 1, a = 6
m.w. = 1263

DCPA - 120

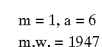
m = 1, a = 6
m.w. = 1947

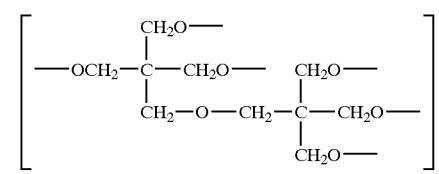

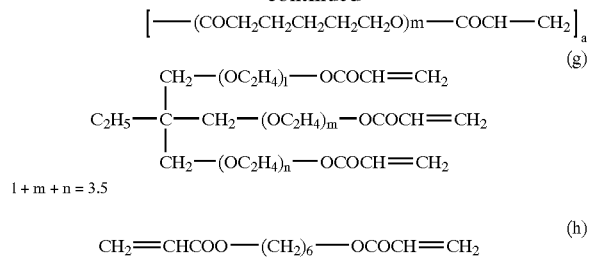

The anisotropic film according to the present invention can be formed by coating, on a substrate having been subjected to orientation, a solution containing a polymerizable dichroic dye, other polymerizable monomer and a polymerization initiator, drying, and then irradiating the coated layer with ultraviolet rays, radial rays or other active rays, or by heating, to thereby effect polymerization.

A polymerizable dichroic dye is orientated when the solution containing the polymerizable dichroic dye is coated on a substrate having been subjected to orientation.

The orientation processing of a substrate is performed by forming an orientation film on the surface of a substrate and then performing rubbing processing.

Transparent substrates such as glass, e.g., float glass and soda glass, and plastic films, e.g., polyethylene terephthalate, polybutylene terephthalate, polyether sulfone, polycarbonate, polyallylate, polyimide resin, and norbornene resin can be used as a substrate in the present invention.

Organic high polymers are used as the materials of the orientation films. The specific examples of such organic high polymers include, e.g., polyimide, polysulfone, polyester, polyamide, polyamic acid, poly(meth)acrylate, polycarbonate, polyphenylene sulfide, polyphenylene oxide, norbornene resin, and polyvinyl alcohol. Above all, polyimide, polyamide, and polyvinyl alcohol are preferred, and polyimide is particularly preferred.

The specific examples of polyimides are disclosed in JP-A-11-14995.

An orientation film can be formed by well-known methods, e.g., by the method of coating the coating solution having dissolved therein the materials of an orientation film on a substrate.

Rubbing processing can also be performed by well-known methods, e.g., by using nylon cloth.

As the polymerization initiator contained in the coating solution to be coated on a substrate having been subjected to orientation, a radical polymerization initiator such as azoisobutyronitrile and benzoyl peroxide can be exemplified.

The coating solution preferably contains in the ratio of from 50 to 95 wt % of a polymerizable dichroic dye, from 1 to 50 wt % of other polymerizable monomer, and from 0.5 to 5 wt % of a polymerization initiator (the components total up to 100 wt %).

In addition to the above components, the coating solution may contain, if necessary, a photosensitizer, a chiral agent, nematic liquid crystal, smectic liquid crystal, a binder and a surfactant.

By incorporating nematic liquid crystals or smectic liquid crystals into the coating solution, the polymerizable dichroic dye is orientated in a nematic or smectic state and the orientation is retained in a hard film after copolymerization. A hard film orientated in a nematic or smectic state, i.e., an anisotropic film orientated in a nematic or smectic state, is polarizable and can be preferably used as a polarizing film of a liquid crystal display.

Further, by the incorporation of a chiral agent, the film obtained becomes a circularly polarizing dichroic film.

For orientating polymerizable dichroic dye in a nematic or smectic state, besides the incorporation of nematic liquid crystals or smectic liquid crystals into a coating solution, a method of application of an outer field, e.g., an electric field or a magnetic field is also effectual.

As has been described, the anisotropic film according to the present invention can be preferably used as the polarizing film of a liquid crystal display so long as it has polarizability. In particular, when the substrate of a liquid crystal display is a plastic substrate such as polyethylene terephthalate, polyether sulfone, etc., for the anisotropy of the substrate, it is preferred to use the anisotripic film of the present invention on the inside of the cell of a liquid crystal display for obtaining excellent light-shielding property.

A specific example of using the anisotropic film according to the present invention as a polarizing film on the inside of the cell of a liquid crystal display is described in Example 1 later. In Example 1, as shown in FIG. 1, on glass substrate 10 are formed in order of ITO film 12 in a thickness of 135 nm, polyimide orientation film 14 in a thickness of 3.9 μm, anisotropic film 16 (a polarizing film) according to the present invention in a thickness of 4.7 μm, and polyimide orientation film 14 in a thickness of 3.9 μm. Two substrates 10 on which these films are formed are adhered in a manner that reciprocal absorption axes based on respective polarizing films 16 cross each other at right angles (orientation directions of the polarizing films are orthogonal), and the orientation film surfaces faced each other, thus a cell is constituted, and liquid crystal 18 is sealed in the cell. Accordingly, the anisotropic film (a polarizing film) according to the present invention is provided on the inside of a cell (hereinafter referred to as "liquid crystal element of structure 1").

In Example 2, the outermost polyimide orientation film on the substrate in Example 1 is omitted and the outermost film comprises the anisotropic film (a polarizing film) according to the present invention (hereinafter referred to as "liquid crystal element of structure 2"). Even with such cell constitution, liquid crystal is orientated when liquid crystal is sealed in the cell. This fact means that the anisotropic film according to the present invention has not only a function of a polarizing film but also a function as an orientation film.

When the anisotropic film of the present invention whose orientation direction is patterned, e.g., the anisotropic film which comprises domains shifting by 90° in the direction of orientation formed alternately and periodically and having a polarizing property, is used as a polarizing film of a liquid crystal display, a liquid crystal display having a plurality of liquid crystal domains periodically different in the state of orientation of the liquid crystal and different in the visual angle characteristic of the liquid crystal in the same twist direction by 90° can be easily obtained. Such a liquid crystal display exhibits excellent visual angle characteristic. By using this liquid crystal display in a stereoscopic image display apparatus, it becomes possible to realize high quality display.

The patternized anisotropic film as above can be manufactured according to the method comprising the following processes (i) to (v):

(i) An orientation film is formed on a substrate and the film is subjected to rubbing processing;

(ii) A patternized resist is formed on the rubbing-processed orientation film and rubbing is performed again in the right angle direction to the above rubbing direction;

(iii) The resist on the orientation film is peeled off, thereby domains whose rubbing directions are shifted by 90° are formed alternately and periodically on the surface of the orientation film;

(iv) The above coating solution containing a polymerizable dichroic dye is coated on the orientation film where the resist has been peeled off, and the dye is orientated. The orientation of the dye is performed according to the rubbing direction of each domain; and (v) Copolymerization is performed by means of ultraviolet ray-irradiation and the like to form an anisotropic film having patternized orientation directions on the orientation film.

A specific example of manufacturing a patternized anisotropic film by the above method is described in Example 3 below.

The thus-patternized anisotropic film can be used as a polarizing film in the above-described liquid crystal element of structure 1 or 2. This patternized anisotropic film can of course be provided on the outside of a substrate to constitute a liquid crystal display.

The present invention will be specifically described below with referring to examples, but it should not be construed as the present invention is limited thereto.

EXAMPLE 1

Polyimide orientation film San-Ever 130 (manufactured by Nissan Chemical Industries, Ltd.) was coated by a spin coat process on a glass substrate with an ITO film, the substrate was baked at 250° C. for 30 minutes, and then subjected to rubbing processing. A solution comprising 3 wt % of the following composition 1 mixed in 2-butanone was coated by a bar coat process on the above substrate. It was confirmed that the coated film showed nematic liquid crystal state during the course of the evaporation of the solution after coating, uniformly orientated, and the absorption axes were parallel to the rubbing direction.

Phase transition to a vitreous state was confirmed as drying progressed. Thereupon the film was hardened by irradiating with UV rays, thereby a hardened anisotropic film having a thickness of 3.9 μm with maintaining the orientation of a dichroic dye was formed on the polyimide orientation film. Polyimide orientation film San-Ever 130 was coated on this anisotropic film by a spin coat process, the coated film was baked at 250° C. for 30 minutes, and then subjected to rubbing processing in parallel to the direction of the absorption axes of the dye. The substrates were adhered using a heat polymerizable adhesive in which a spherical spacer having a diameter of 7 μm was mixed in a manner that reciprocal absorption axes crossed each other at right angles and the orientation film surfaces faced each other, thus the cell for a liquid crystal display was prepared.

Figure 2:
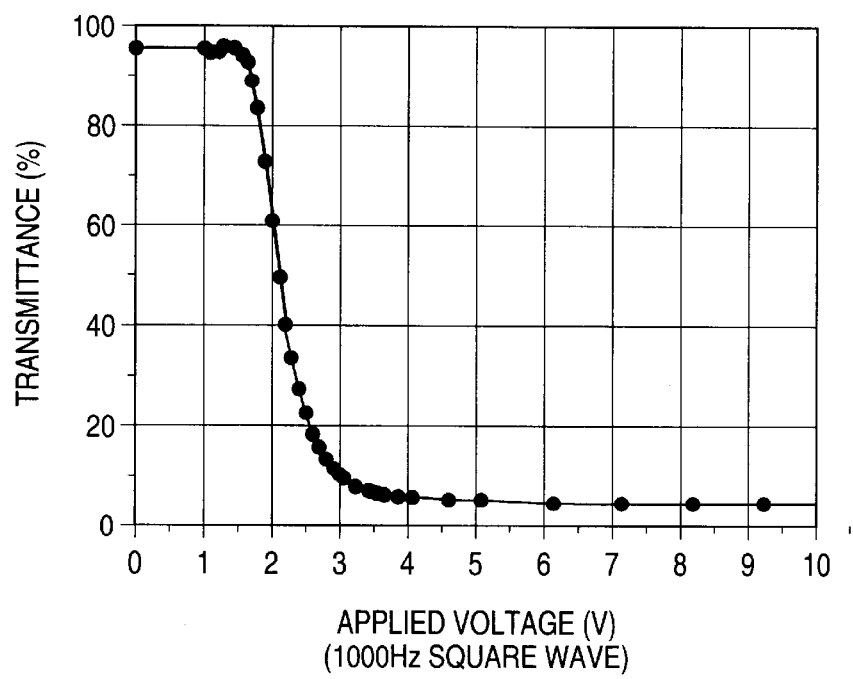
FIG. 2 is a graph showing the relationship between the applied voltage and the light transmittance of the liquid crystal display prepared in Example 1.

Nematic liquid crystal composition ZL1-1132 (manufactured by Merc Co., Ltd.) in which a trace amount of a chiral agent was mixed was injected into the cell to obtain a liquid crystal display. When voltage was applied to the liquid crystal display, clear variation of light transmittance of wavelength of 550 nm according to the applied voltage was observed. The relationship between the applied voltage and the light transmittance is shown in FIG. 2.

This result clearly shows that the anisotropic film according to the present invention can be used in a cell as a polarizing film of a liquid crystal display.

EXAMPLE 2

A liquid crystal display was prepared in the same manner as in Example 1, except that the formation of the polyimide orientation film and the succeeding rubbing processing after the formation of the hardened anisotropic film were omitted. When voltage was applied to the thus-prepared liquid crystal display, clear variation of light transmittance according to the applied voltage was observed.

This fact clearly means that the anisotropic film according to the present invention can be not only used in a cell as a polarizing film of a liquid crystal display but also has a liquid crystal orientating property and functions as an orientation film.

EXAMPLE 3

Polyimide orientation film San-Ever 130 (manufactured by Nissan Chemical Industries, Ltd.) was coated by a spin coat process on a glass substrate with an ITO film, the substrate was baked at 250° C. for 30 minutes, and then subjected to rubbing processing. A photosensitive resist was coated thereon, the patterning of the resist layer was performed by mask exposure and development, and rubbing processing was performed in the direction orthogonal to the first rubbing direction.

The resist layer on the orientation film was completely removed, a solution comprising 3 wt % of composition 1 mixed in 2-butanone was coated thereon by a bar coat process, and irradiated with UV rays to harden the film.

When the hardened film on the substrate was visually observed through a polarizing plate, it was confirmed that the pattern of orientation of the dichroic dye corresponding to the pattern of the patternized resist layer was formed.

Composition 1 (for photo-orientation processing and multi-domain orientation processing)

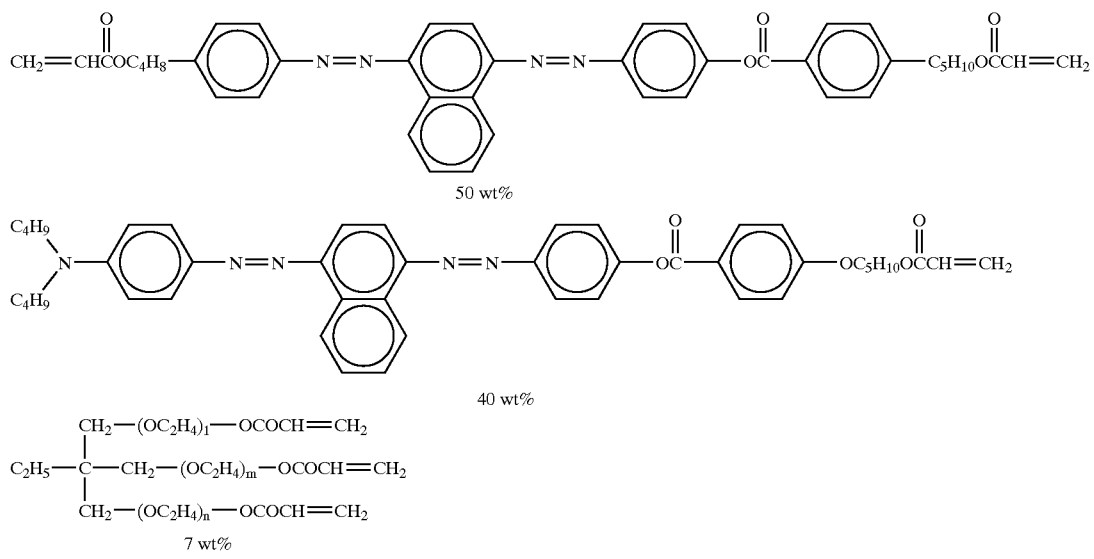

Irgacure - 907 (manufactured by Nippon Kayaku Co., Ltd.)
3 wt%

The anisotropic film of the present invention is manufactured by orientating a dichroic dye in high order and fixing the dye while maintaining the orientation. Therefore, for example, even a thin layer having a thickness of 0.1 μm or so can be made a polarizing film having high polarizing property. Accordingly, as has been conventionally substantially impossible, it becomes possible to provide a polarizing film on the inside of the cell of a liquid crystal display by using the anisotropic film of the present invention. As a result, a liquid crystal display capable of ensuring sufficient light-shielding property and free of the problem of a leak of light can be obtained even when a plastic substrate is anisotropic.

When the anisotropic film of the present invention whose orientation direction is patternized and having a polarizing property is used as a polarizing film of a liquid crystal display, a liquid crystal display having a plurality of liquid crystal domains periodically different in the state of orientation of the liquid crystal and different in the visual angle characteristic of the liquid crystal in the same twist direction by 90° can be easily obtained. Such a liquid crystal display exhibits excellent visual angle characteristic.

While the invention has been described in detail and with reference to specific examples thereof, it will be apparent to one skilled in the art that various changes and modifications can be made therein without departing from the spirit and scope thereof.

What is claimed is:

1. A method for producing an anisotropic film which comprises forming a copolymer of a monomer containing a dichroic dye having a carbon-carbon unsaturated bond with a different monomer having a carbon-carbon unsaturated bond to obtain a film, wherein the dichroic dye having a carbon-carbon unsaturated bond is oriented in the film, wherein the film is formed by coating, on a substrate having been subjected to orientation, a solution containing the monomer containing a dichroic dye having a carbon-carbon unsaturated bond, the different monomer having a carbon-carbon unsaturated bond and a polymerization initiator, orienting the dichroic dye contained in the solution, and performing a copolymerization reaction in the oriented state.

2. The anisotropic film as claimed in claim 1, wherein the film is formed by coating, on a substrate having been subjected to orientation, a solution containing the monomer containing a dichroic dye, the different monomer and a polymerization initiator, orienting the dichroic dye contained in the solution, and performing a copolymerization reaction in the orientated state.

3. The method for producing an anisotropic film as claimed in claim 1, wherein the coating solution contains from 50 to 95 wt % of a dichroic dye, from 1 to 50 wt % of the different monomer, and from 0.5 to 5 wt % of the polymerization initiator, based on the weight of the weight of the three components.

4. The method for producing an anisotropic film as claimed in claim 1, wherein the nematic state orientation of the dichroic dye is maintained in the anisotropic film.

5. The method for producing an anisotropic film as claimed in claim 1, wherein the smectic state orientation of the dichroic dye is maintained in the anisotropic film.

6. The method for producing an anisotropic film as claimed in claim 1, wherein the orientation direction of the polymerizable dichroic dye is maintained in the film in a pattern formed by alternately shifting the direction of orientation by 90°.

7. A liquid crystal display, comprising a cell and a polarizing film provided on the inside of said cell, wherein said polarizing film comprises the anisotropic film as claimed in claim 1.

8. A liquid crystal display, wherein the anisotropic film as claimed in claim 6 is provided at a cell as a polarizing film.

9. The liquid crystal display as claimed in claim 8, wherein the anisotropic film is provided on the inside of a cell.

* * * * *